(No Model.) 2 Sheets—Sheet 1.

J. H. DAVIS.
ELECTRIC BATTERY.

No. 489,938. Patented Jan. 17, 1893.

WITNESSES
F. Clough
J. W. Bradford

INVENTOR
John H. Davis
by Parker & Burton
Attorneys.

(No Model.) 2 Sheets—Sheet 2.

J. H. DAVIS.
ELECTRIC BATTERY.

No. 489,938. Patented Jan. 17, 1893.

WITNESSES
F. Chough.
J. W. Bradford.

INVENTOR
John H. Davis
by Parker & Burton
Attorneys.

UNITED STATES PATENT OFFICE.

JOHN H. DAVIS, OF DETROIT, MICHIGAN.

ELECTRIC BATTERY.

SPECIFICATION forming part of Letters Patent No. 489,938, dated January 17, 1893.

Application filed March 28, 1892. Serial No. 426,687. (No model.)

*To all whom it may concern:*

Be it known that I, JOHN H. DAVIS, a citizen of the United States, residing at Detroit, county of Wayne, State of Michigan, have invented a certain new and useful Improvement in Electric Batteries; and I declare the following to be a full, clear, and exact description of the invention, such as will enable others skilled in the art to which it pertains to make and use the same, reference being had to the accompanying drawings, which form a part of this specification.

My invention relates to electric batteries, and more especially to that class employing carbon elements, and consists in the peculiar form given to the carbons and the manner of holding the excitant, and also in the improved means of insulating the zinc element, and in the combination of the various parts.

Figure 7:
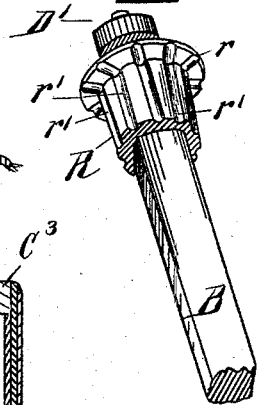

The various figures, except Figure 7, show various forms in which the battery may be constructed, but all involving the same fundamental principle.

Figures 2, 4:
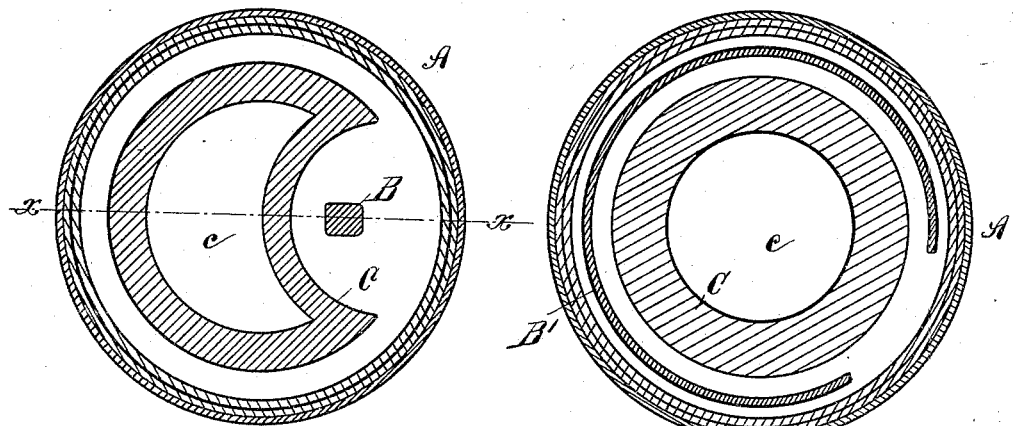
Figures 1, 3:
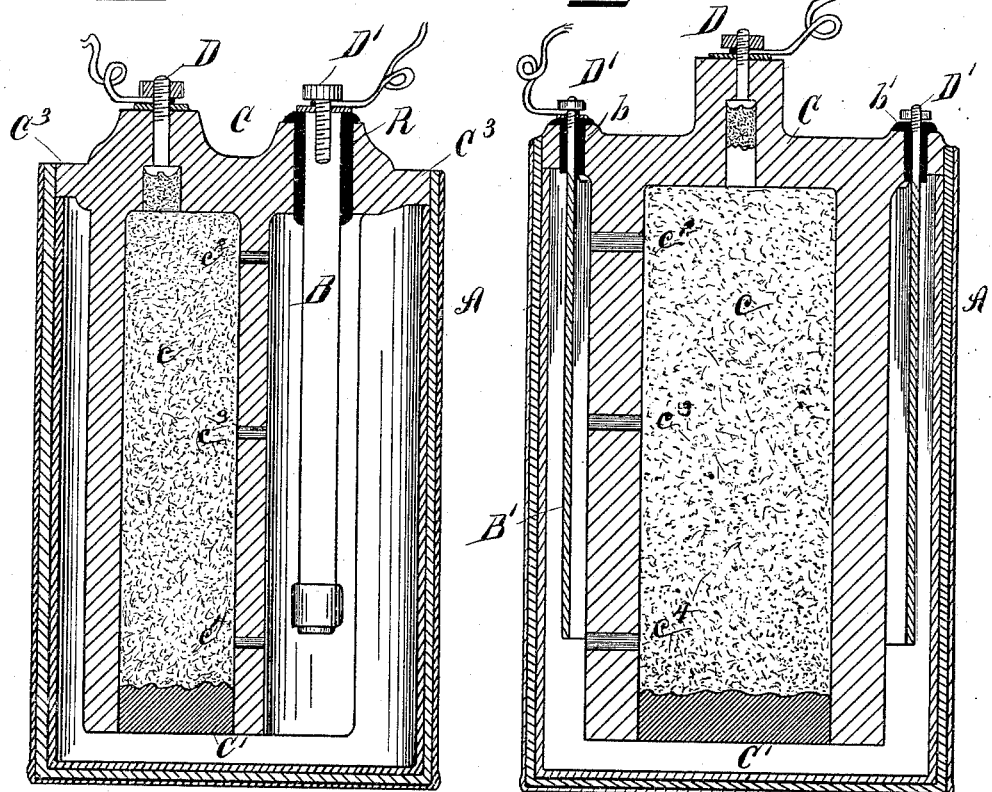
Figure 6:
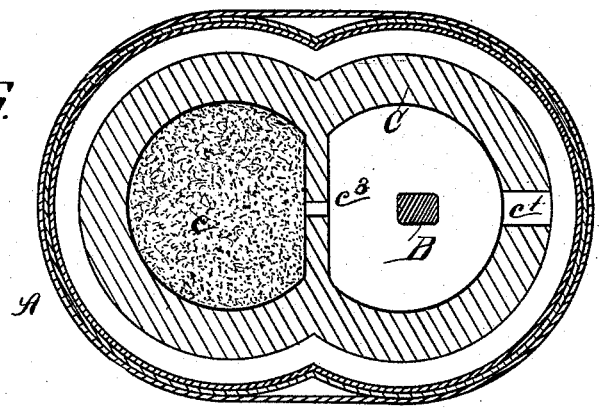
Figure 5:
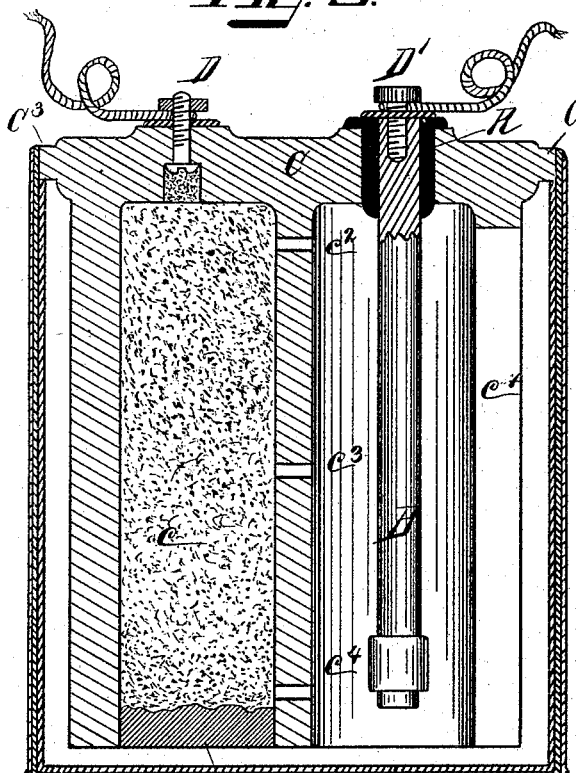

In the drawings, Fig. 1 is a vertical central section through a cell of my battery on the line $x\ x$ of Fig. 2. Fig. 2 is a horizontal cross section of Fig. 1, showing the form of the element, and the chamber formed in the interior of the carbon element. Fig. 3 is a vertical central section of another form of cell employing the same principle, Fig. 4 being a horizontal cross section of the same. Fig. 5 represents a vertical central section of a cell, constituting another variation, of which Fig. 6 is a cross section. Fig. 7 illustrates my improved means of insulating the zincs.

Similar letters refer to similar parts.

In the drawings, A represents my improved cell, the peculiar construction of which is not herein described, as it is reserved for a further application.

B represents a zinc rod.

C represents the carbon element, which contains within it the chamber $c$; the carbon element C is closed at the top, and flanged, as shown at $C^3$, so that it may rest upon one or more of the cell walls. If a glass cell be used, the carbon flange could rest directly upon the edge or top of the glass. As shown in Fig. 2, the carbon element is hollowed out upon one side below the flange, and in this hollow is placed the zinc element depending from the flange, and in which it is secured by means of a rubber insulator of the form shown in Fig. 7.

D, D', represent binding posts to which the communicating wires may be attached.

C' represents cement which is placed in the bottom of the cavity formed in the carbon cell for the purposes hereinafter described.

In the various drawings, $c^2$, $c^3$, $c^4$ represent small holes through the walls of the carbon element, by which communication is established between the interior of the carbon element and the space surrounding it inside of the cell wall.

Fig. 3 shows a modification in which the carbon element $C^2$ is in the form of a hollow cylinder closed and flanged at its upper end, the flanges resting upon the cell walls and supporting the carbon thereby. The interior chamber is closed as in Fig. 1, and for the same purpose. B' represents the zinc element, which nearly surrounds the carbon element, instead of being in the form of a rod, as shown in Fig. 1. Two small holes, $b$, and $b'$, upon opposite sides of the flange of the carbon element, permit insulated projections from the upper edge of the zinc element to pass through the carbon element, and to one or the other of them may be attached the binding post. These serve to support the zinc element in place.

Fig. 5 shows another modification, in which the carbon is made in the form of joined sectors of two hollow cylinders, the excitant being placed in one of the chambers thus formed, and the zinc rod B in the other chamber, the diaphragm between the two chambers having holes $c^2$, $c^3$, $c^4$. Opposite to the diaphragm the carbon is cut through by a slot $c'$, so as to permit the liquid surrounding the carbon element to circulate within the chamber for the zinc. It will be perceived that all of these forms are very simple modifications of the same principle, and that they respectively need no extended description. It is obvious that very many other forms might be adopted, in which the general principle of a carbon element containing an inclosed chamber in which the excitant is placed, and afterward sealed at the bottom, may be employed.

In Fig. 7 I have shown my improved insulator, which is very simple and very effective. The zinc rod B has surrounding it at the point where it passes through the carbon a soft rubber thimble R; the hole in the rubber being slightly smaller than the zinc rod, it engages it tightly. The rubber thimble R has, when placed on the zinc, at its upper edge, a flange $r$. There are longitudinally formed in the rubber thimble and in the flange, coincident grooves $r', r', r'$. When the rubber is placed in position in the carbon element and inclosing the zinc, as is shown in Fig. 5, these grooves form small air outlets, by which the gases that are generated in the battery are allowed to escape, and yet they are so small that it is substantially a sealed battery when the carbon is fitted in and sealed, as it may be, in the cell walls. It also holds the zinc firmly in position, so that no amount of movement or disturbance would result in its coming in contact with the carbon element by swinging or otherwise. It will be seen that the zinc and insulator are as readily removable as a cork from the opening in the carbon and that additional liquid can be introduced through the opening thus formed, and the zinc and insulator afterward replaced, again leaving the battery perfectly sealed.

The mode of operation in charging the battery is as follows: The excitant, which may be of sal-ammoniac or any suitable material, is first placed in the chamber $c$ of the carbon element before the carbon element is introduced into the cell. After the introduction of the excitant, the chamber is closed at its lower end by the cement C'. This cement may be of any material which will be retained in the carbon and prevent the falling out into the cell of the excitant. The carbon element is then introduced into the cell, substantially as shown in the drawings. The water is introduced and the zinc element put in place. It is then connected up, as in any ordinary battery. In the form shown in Figs. 3 and 4, the zinc element is attached to the carbon element by means of the insulators and binding posts, before the introduction of the carbon into the cell. The cell may be partially filled with water also before the introduction of the carbon, instead of after, as in the other forms shown. At once action is set up, and the battery proceeds to operate.

The advantages of this form over those heretofore used are these: By introducing the excitant into the chamber formed in the carbon element, and keeping it within that chamber, only permitting the liquid to come in contact with it through the holes $c^2, c^3, c^4$, over-saturation of the liquid is entirely avoided. There is no accumulation whatever of crystals in the bottom of the cell to cause change in the electro-motive force or to set up resistance. The liquid always remains saturated, and is thus constant in its chemical power. A circulation is set up, the liquid rising along the walls on the zinc, passing in through the upper hole $c^2$, down through the excitant in the chamber $c$, and out through the lower hole $c^4$. This circulation is due in part to the chemical action of the zinc and the creation of gases, and in part due to the difference in the specific gravity of the liquid, in consequence of the chemical action. I have found that, by means of this circulation, the zincs always exhaust from the bottom; that the battery is uniform in its action until the zinc is wholly used up to the top of the inclosed excitant liquid; and that a very common defect of other batteries, which is the corroding away and cutting off of the zinc at or near the surface of the excitant liquid, thus resulting in the loss of zinc, is entirely avoided.

A depolarizer, such as manganese, can be placed in the chamber $c$ with the excitant if desired. It is also evident that the holes $c^2$, $c^3$, and $c^4$, might be dispensed with, provided the carbon element be made porous enough to permit the circulation of the fluid, as the holes thus described are really large pores in the wall of the element, and are adapted to secure certainty in the circulation, as they are not as liable to be clogged as smaller pores might be.

Having thus described my invention, what I desire to claim is—

1. In a primary battery, the combination of a carbon element, a zinc element, and an insulator interposed between the two, constructed of soft rubber and having grooves $r'$ $r'$ in the periphery thereof, substantially as described.

2. An insulator for a sealed primary battery, consisting of a rubber thimble adapted to engage one of the elements thereof and having upon its periphery grooves $r' r'$, substantially as described.

3. A sealed battery, consisting of a carbon element containing an excitant chamber sealed at its lower end and having communications between said chamber and the surrounding space, by means of holes at the top and bottom thereof, whereby circulation of a solvent is secured, and having a flange tightly fitting the cell wall at all points, a zinc element passing through and supported by said flange and insulated therefrom by a soft rubber insulator consisting of a thimble containing longitudinal grooves, substantially as described and for the purposes set forth.

In testimony whereof I sign this specification in the presence of two witnesses.

JOHN H. DAVIS.

Witnesses:
MARION A. REEVE,
DELL J. BROWNE.